E. D. KENDALL.
PROCESS FOR PRODUCING COAL TAR DYES.
APPLICATION FILED APR. 5, 1918.

1,326,665.

Patented Dec. 30, 1919.

INVENTOR
Edward D. Kendall

UNITED STATES PATENT OFFICE.

EDWARD D. KENDALL, OF ELIZABETH, NEW JERSEY, ASSIGNOR TO HAGGIN ESTATE, INC., A CORPORATION OF NEW YORK.

PROCESS FOR PRODUCING COAL-TAR DYES.

1,326,665.   Specification of Letters Patent.   Patented Dec. 30, 1919.

Application filed April 5, 1918. Serial No. 226,925.

*To all whom it may concern:*

Be it known that I, EDWARD D. KENDALL, a citizen of the United States, residing at Elizabeth, in the county of Union and State of New Jersey, have invented a new and useful Process for Producing Coal-Tar Dyes, of which invention the following is a specification.

This invention relates to processes of producing dyes from nitro-substitution products of benzene and homologous hydrocarbons and their amido-derivatives and its object is to produce dyes by electrolysis in such method as to avoid the production of indulin blacks; in order that this shall be accomplished it is necessary to prepare an electrolyte containing an agent that shall act to control and limit the oxidizing action at the positive electrode; after many experiments I have found such an agent in dimethyl ketone, that is acetone, which acts as a preventive of excessive oxidation thereby preventing the forming of indulin blacks, limiting the oxidizing action to color-production from the amido-body or bodies generated by reduction of the said nitro-body or bodies and favorably modifying the colors of the dyes produced.

Figure 1:
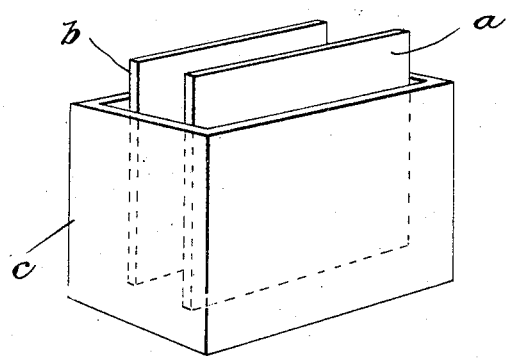
Figure 2:
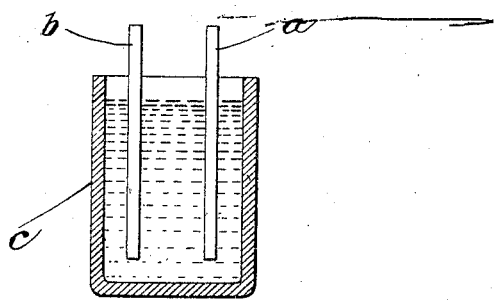

Any suitable forms of electrolytic cells may be used, with or without contained porous cells and with electrodes of any suitable materials. I prefer to use electrodes of hard graphitic carbon. The simple form of electrolytic cell shown by the accompanying drawing will answer the purpose. In Figures 1 and 2 of this drawing, *a* represents the carbon anode and *b* the carbon cathode; *c* represents the container of the electrolyte; this container may be of any suitable material, when small, of glass, when large, of chemical stoneware.

In carrying out my invention I dissolve, for example, one volume of nitrobenzene in say twenty volumes of acetone, free from adulterants, and add to this solution or mixture nearly as much diluted sulfuric acid as the solution will bear without separation of nitrobenzene, say four or five volumes of the diluted acid. In preparing the dilute sulfuric acid I prefer to use one volume of concentrated sulfuric acid ($H_2SO_4$) and only four volumes of water, in order to add to the acetone solution a sufficient and not an excessive quantity of water.

I put this electrolyte, so prepared, into an electrolytic cell which should be kept cool by any available well-known means, as by placing it within a larger vessel containing cold water, with or without ice. This electrolytic cell may be covered to limit evaporation and the greater part of the acetone may be recovered finally by distillation.

An electric current of ten to fifteen volts may suffice for one electrolytic cell, the required potential varying somewhat with the dimensions of cells and, of course, increasing with the number of cells arranged in series.

Reduction of the nitrohydrocarbons in contact with the negative electrode generates the corresponding amido-derivatives and these in contact with the positive electrode and under the influence of the acetone yield the dyes free from indulin blacks and, also by chemical action of the acetone, with favorably modified tints.

I claim:

The herein described process of producing dyes from nitrobenzene and homologues thereof by electrolyzing an electrolyte consisting of one or more of the said nitrobodies, acetone, water and sulfuric acid.

EDWARD D. KENDALL.

It is hereby certified that Letters Patent No. 1,326,665, granted December 30, 1919, upon the application of Edward D. Kendall, of Elizabeth, New Jersey, for an improvement in "Processes for Producing Coal-Tar Dyes," were erroneously issued to Haggin Estate, Inc., a corporation of New York, as owner of said invention, whereas said Letters Patent should have been issued to the *inventor, said Kendall*, and *Haggin Estate, Inc., jointly*, said corporation being assignee of *one-half* interest only, as shown by the records of assignments in this office; and that the said Letters Patent should be read with this correction therein that the same may conform to the record of the case in the Patent Office.

Signed and sealed this 17th day of Febuary, A. D., 1920.

[SEAL.]

M. H. COULSTON,
*Acting Commissioner of Patents.*

Cl. 204—61.